F. E. BRESLER.
COAT PROTECTOR.
APPLICATION FILED AUG. 13, 1915.
1,189,534.
Patented July 4, 1916.
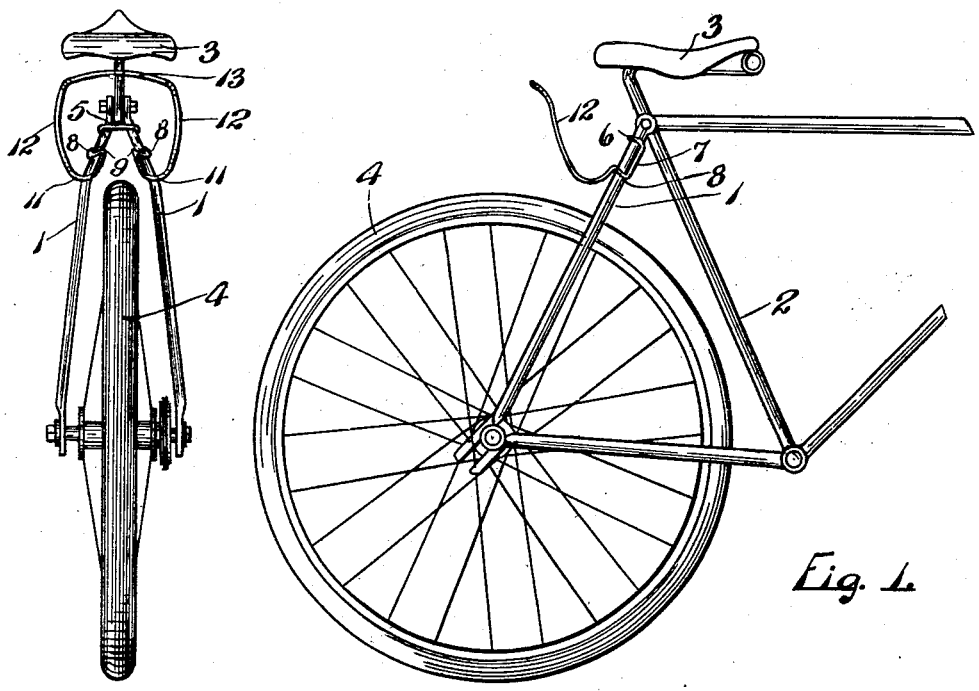
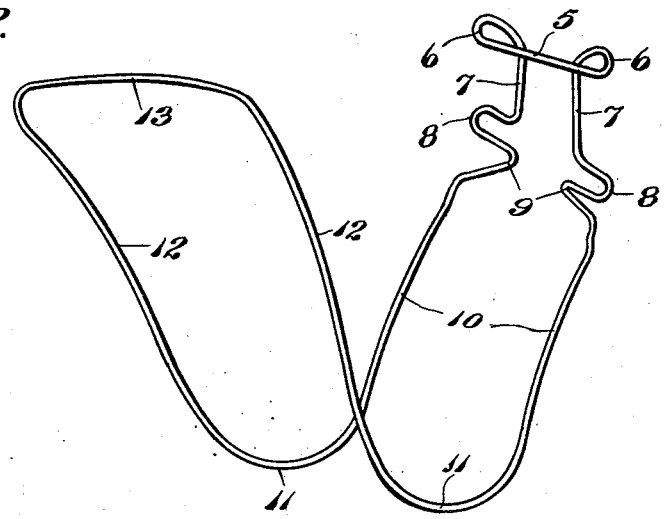
Witnesses
Howard H. Yarrington
Marie York
Inventor
Fred E. Bresler
By Moulton & Livermore
Attorneys

UNITED STATES PATENT OFFICE.

FRED E. BRESLER, OF BAY CITY, MICHIGAN.

COAT-PROTECTOR.

1,189,534.  Specification of Letters Patent.  Patented July 4, 1916.

Application filed August 13, 1915. Serial No. 45,423.

*To all whom it may concern:*

Be it known that I, FRED E. BRESLER, a citizen of the United States of America, residing at Bay City, in the county of Bay and State of Michigan, have invented certain new and useful Improvements in Coat-Protectors; and I do hereby declare the following to be a full, clear, and exact description of the invention, such as will enable others skilled in the art to which it appertains to make and use the same.

This invention relates to coat protectors adapted to be used in connection with bicycles or motor-cycles. And it has for its object the protection of a coat from contact with the rear wheel of a bicycle or motor-cycle whereby it is prevented from being drawn by the wheel into the rear fork of the bicycle or motorcycle avoiding the injury that would result therefrom. The construction by which this end is attained is shown in the following drawing, in which:

Figure 1 is a side view of the rear portion of a bicycle having my improved coat protector secured thereto. Fig. 2 is a rear elevation of the construction shown in Fig. 1; and Fig. 3 is a perspective view of the coat protector.

Like reference characters refer to like parts throughout the several views of the drawing.

This coat protector is adapted to be applied to the rear fork members 1 which form a part of the frame 2 of the bicycle or motorcycle, the coat protector being located below the saddle 3 and above the rear wheel 4 as shown in Figs. 1 and 2. In construction the protector is formed from a single piece of wire having a section 5 lying substantially horizontal, at each end of which it is bent to form the loops 6, thence extending downwardly and outwardly for a distance as shown at 7, the lower ends of sections 7 being formed into the U-shaped portions 8 which in turn are again bent outwardly at 9 and thence downwardly at 10. The lower ends of section 10 are then formed with the curves shown at 11 and thence extended upwardly and to the rear at 12, and the upper ends of parts 12 are connected together by the integral cross member 13.

In the application of the holder to a bicycle or a motorcycle, a section 7 with loops 6 and 8 at the upper and lower ends thereof, respectively, is placed over one of the members 1 of the rear fork of a bicycle or motorcycle, said loops receiving the tubular member 1 and in a similar manner the opposite tubular member 1 is received by the opposite loops 6 and 8. It will be noted that the fork members flare outwardly from each other and that the sections 7 of the coat protector lie at a substantially equal angle to the vertical so that the protector is easily applied and forced downwardly until the separation of the fork members 1 causes them to bear against loops 6 and 8, the protector being held in place by reason of the tendency of the device to slide downwardly on the fork members as will be clearly apparent.

In operation a bicycle or motorcycle equipped with this device will serve to hold the lower end of a coat away from the wheel 4 and there will be no danger of its being drawn between said wheel and the rear fork members 1. This device is of very economical construction and applied to and taken off a bicycle or motorcycle substantially instantaneously.

The claims appended define the invention and all modifications in structure falling within their scope are to be considered as covered by the invention.

I claim:—

1. A coat protector comprising spaced apart wire elements connected at their ends by horizontal cross members, means formed in said elements adjacent one cross member for detachably securing the protector to the rear fork of a bicycle or motorcycle, and bends in said elements between the ends thereof whereby when attached to a bicycle or motorcycle, the ends of the protector are located above the middle portion thereof.

2. A coat protector formed from a single piece of wire including a horizontal section having loops formed at each end and thence extending downwardly and outwardly for a short distance, other loops formed at the ends of said downwardly and outwardly extended portions thence extending downwardly for a distance and then curved upwardly, and a second horizontal section connecting the ends of said portions, substantially as described.

3. In combination with the rear fork of a bicycle or motorcycle, a coat protector including a horizontal section lying across and between the fork members, loops integral with said cross members engaging with the fork, and means connected with said loops and lying back of the fork adapted to receive a garment and prevent it from entering between the members of the fork, substantially as described.

4. A coat protector including spaced apart wire elements connected at their ends by substantially horizontal cross members, said wire elements being formed to make depressed central portions, and means formed in the wire elements adjacent one of the cross members for detachably engaging and securing the protector to the downwardly and outwardly extending members of the rear fork of a bicycle or motorcycle, substantially as described.

In testimony whereof I affix my signature in presence of two witnesses.

FRED E. BRESLER.

Witnesses:
FRANK C. LEAMAN,
JOHN A. WHITAKER.

Copies of this patent may be obtained for five cents each, by addressing the "Commissioner of Patents, Washington, D. C."